(12) United States Patent
Lai

(10) Patent No.: US 10,703,134 B2
(45) Date of Patent: Jul. 7, 2020

(54) QUICK-RELEASE DEVICE AND METHOD FOR SECURING/RELEASING THE SAME

(71) Applicant: Shang Hua Lai, Taichung (TW)

(72) Inventor: Shang Hua Lai, Taichung (TW)

( * ) Notice: Subject to any disclaimer, the term of this patent is extended or adjusted under 35 U.S.C. 154(b) by 319 days.

(21) Appl. No.: 15/884,583

(22) Filed: Jan. 31, 2018

(65) Prior Publication Data

US 2019/0111733 A1    Apr. 18, 2019

(30) Foreign Application Priority Data

Oct. 13, 2017    (TW) .............................. 106135083 A

(51) Int. Cl.
*B60B 27/02*    (2006.01)
*B62K 25/02*    (2006.01)

(52) U.S. Cl.
CPC ............ *B60B 27/026* (2013.01); *B62K 25/02* (2013.01); *B62K 2025/025* (2013.01); *B62K 2206/00* (2013.01)

(58) Field of Classification Search
CPC .............................. B60B 27/026; B62K 25/02; B62K 2025/025; B62K 2206/00
See application file for complete search history.

(56) References Cited

U.S. PATENT DOCUMENTS

| 7,735,937 | B2* | 6/2010 | Chonan | B62K 25/02 |
| | | | | 301/124.2 |
| 8,382,134 | B2* | 2/2013 | Bartlett | B62K 25/02 |
| | | | | 280/279 |
| 10,173,747 | B2* | 1/2019 | Kuerner | B62K 25/02 |
| 10,189,306 | B2* | 1/2019 | Thoma | B60B 27/047 |
| 10,202,165 | B2* | 2/2019 | Nakajima | B62K 25/02 |
| 2008/0185908 | A1* | 8/2008 | Hara | B60B 27/026 |
| | | | | 301/124.2 |
| 2008/0315678 | A1* | 12/2008 | Watarai | B60B 27/0052 |
| | | | | 301/110.5 |
| 2013/0270893 | A1* | 10/2013 | Schlanger | B60B 27/026 |
| | | | | 301/105.1 |

FOREIGN PATENT DOCUMENTS

FR    3037863 B1 *    7/2017    ........... B60B 27/026

* cited by examiner

*Primary Examiner* — Kip T Kotter
(74) *Attorney, Agent, or Firm* — Rosenberg, Klein & Lee

(57) ABSTRACT

A quick-release device includes a tube having multiple holes defined through the wall in the first end thereof, and a seat is connected to the second end of the tube. A sleeve is located in the first end of the tube. Multiple stop members are located in the tube and movably engaged with the holes respectively. Each stop member has an inclined face defined in the underside thereof. A lever includes a cam portion pivotably mounted to the first end of an axle which extends through the tube. An end member is movably connected to the first end of the tube and is secured to the second end of the axle. When pivoting the lever, the end member is moved toward the seat or moved away from the seat to be the secure status or the release status.

6 Claims, 10 Drawing Sheets

QUICK-RELEASE DEVICE AND METHOD FOR SECURING/RELEASING THE SAME

BACKGROUND OF THE INVENTION

1. Fields of the Invention

The present invention relates to a quick-release device, and more particularly, to a quick-release device which does not need a nut.

2. Descriptions of Related Art

The conventional quick-release device 9 known to applicant is disclosed in FIG. 10 and generally used to secure the wheel to the frame of a bicycle. The conventional quick-release device comprises an axle 91 that extends through the hub 8 of a bicycle, a nut 92 threadedly connected to one end of the axle 91, a lever 93 pivotably connected to the other end of the axle 91, and a seat 94 connected to the axle 91 and located next to the lever 93.

By pivoting the lever 93 which is pivotable as a cam so as to pull the nut 92 toward the lever 93 to secure the hub 8 to the frame 7. On the contrary, when pivoting the lever 93 in the opposite direction, the axle 91 is no longer to pull the nut 92 toward the lever 93, so that the hub 8 can be separated from the frame 7.

However, the nut 92 can be easily lost from the quick-release device 9, and once there is no such the nut 92 connected to the axle 91, the quick-release device will be functionless.

The present invention intends to provide a quick-release device that does not need a nut. Besides, the present invention intends to provide a method for securing the quick-release device.

SUMMARY OF THE INVENTION

The present invention relates to a quick-release device and comprises a tube having multiple holes defined through the wall in the first end thereof. A seat is connected to the second end of the tube. A sleeve is located in the first end of the tube. Multiple stop members are located in the first end of the tube and movably located on outside of the sleeve. The stop members are engaged with the holes respectively. Each stop member has an inclined face defined in the underside thereof. A lever has a cam portion which is pivotably mounted to a first end of an axle, and the axle extends through the tube. An end member is movably connected to the first end of the tube. The second end of the axle is connected to the end member. When pivoting the lever, the end member is moved toward the seat or moved away from the seat.

Preferably, a spring is mounted to the axle and biased between the seat and the end member.

Preferably, the stop members each are an L-shaped member.

Preferably, the sleeve includes multiple grooves defined axially in the outside thereof. The stop members are located in the grooves respectively.

Preferably, a ring are resiliently mounted to the stop members to position the stop members in the grooves of the sleeve.

Preferably, the end member includes multiple inclined paths defined axially in the outside thereof. The stop members are moved along the inclined paths and partially protrude through the holes when the lever is pivoted to set the quick-release device at the secured status.

The primary object of the present invention is to provide a quick-release device that does not need a nut. The spring is mounted to the axle and biased between the seat and the end member so that the response of the movement of the axle is quick.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
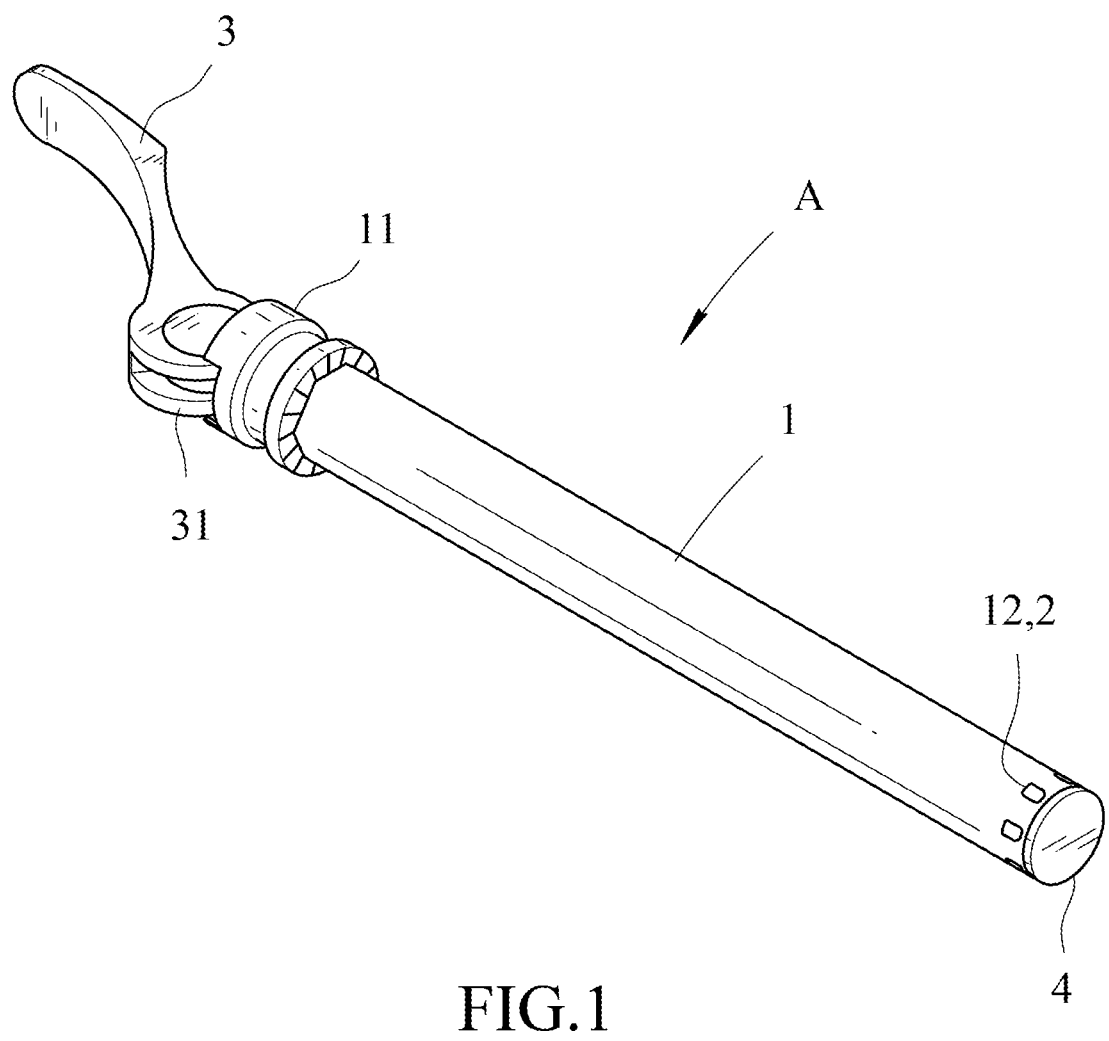
FIG. 1 is a perspective view to show the quick-release device of the present invention.
Figure 2:
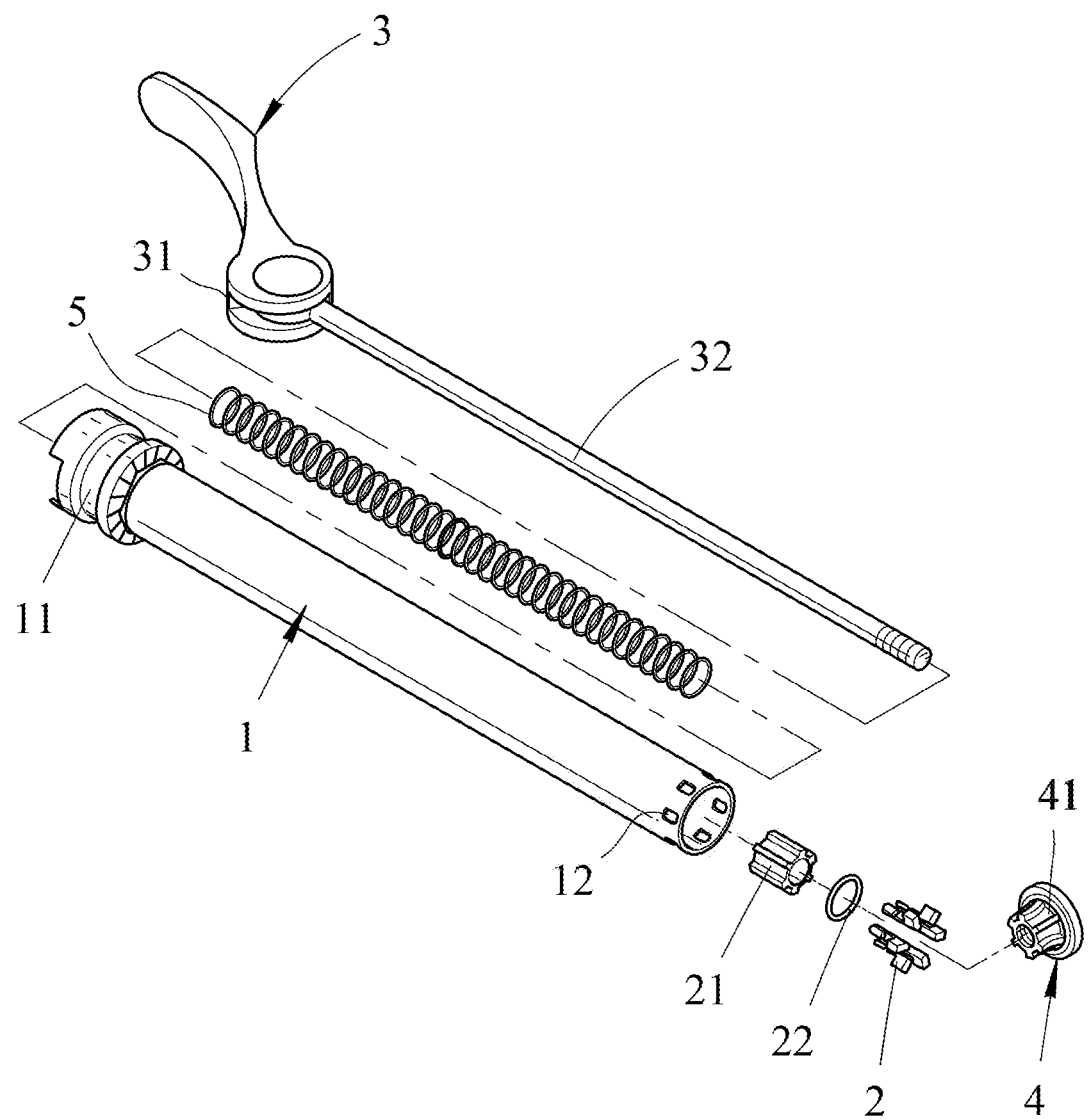
FIG. 2 is an exploded view of the quick-release device of the present invention.
Figure 3:
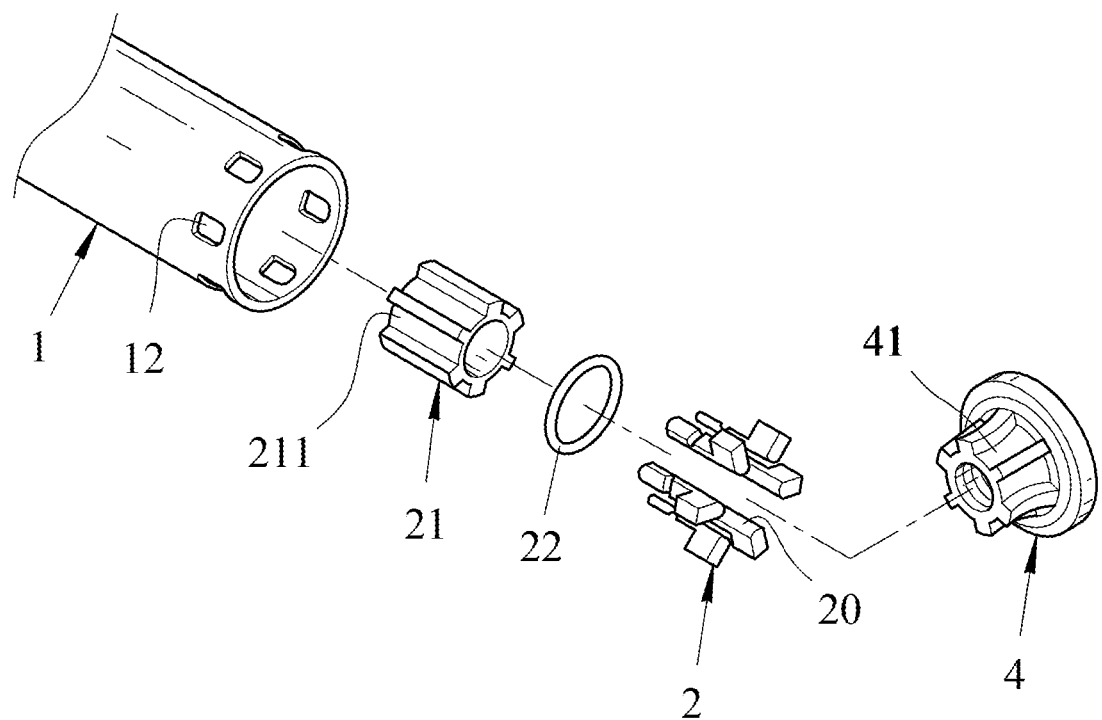
FIG. 3 is an enlarged exploded view of a portion of the quick-release device of the present invention.
Figure 4:
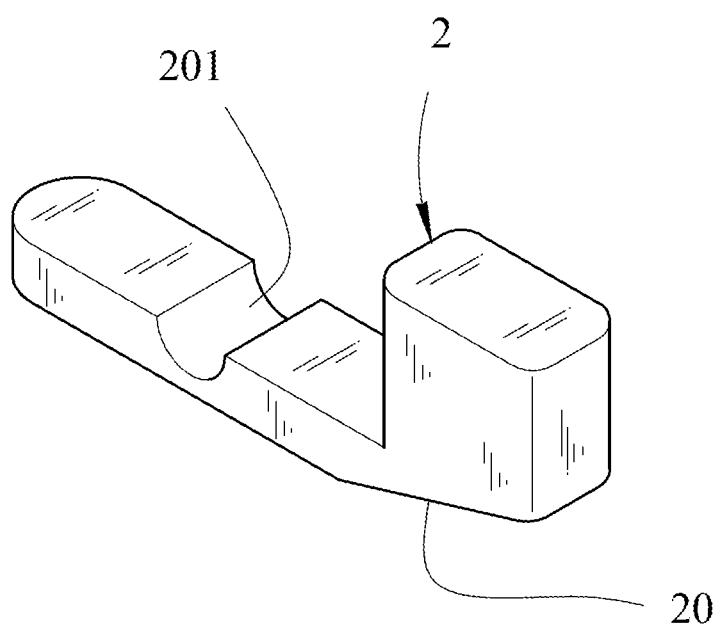
FIG. 4 shows the stop member of the quick-release device of the present invention.

Referring to FIGS. 1 to 5, the quick-release device "A" of the present invention comprises a tube 1 having multiple holes 12 defined through the wall in the first end thereof, and a seat 11 is connected to the second end of the tube 1. A sleeve 21 is located in the first end of the tube 1 and includes multiple grooves 211 defined axially in the outside thereof. Multiple stop members 2 are located in the first end of the tube 1 and in the grooves 211 respectively. A ring 22 is resiliently mounted to the stop members 2 to position the stop members 2 in the grooves 211 of the sleeve 21. The stop members 2 each are an L-shaped member, and each stop member 2 includes a portion 201 formed thereon, an inclined face 20 defined in the underside thereof, and a protrusion extending from the top thereof. The protrusion is movably engaged with the hole 12 corresponding thereto.

A lever 3 has a cam portion 31 which is pivotably mounted to a first end of an axle 32. The first end of the axle 32 is a round disk so that the cam portion 31 of the lever 3 is pivotable relative to the round disk. The axle 32 extends through the tube 1 and the second end of the axle 32 connected to the end member 4. The end member 4 includes a tapered insertion portion which is movably inserted into the first end of the tube 1. The end member 4 includes multiple inclined paths 41 defined axially in the outside of the tapered insertion portion, and the stop members 2 are moved along the inclined paths 41 by the inclined faces 20. A spring 5 is mounted to the axle 32 and biased between the seat 11 and the end member 4.

Figure 5:
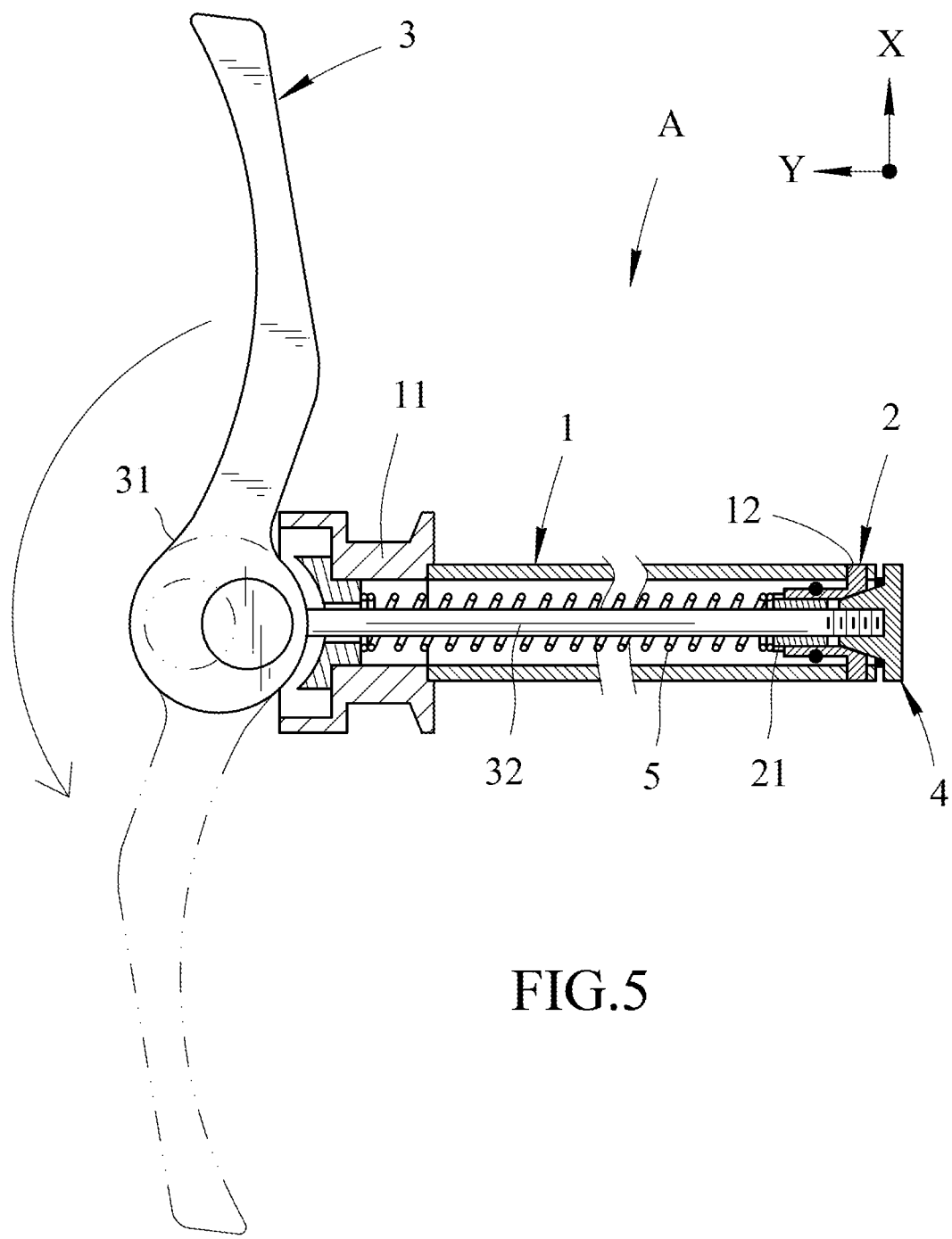
FIG. 5 shows the operation of the lever of the quick-release device of the present invention.

As shown in FIG. 5, when the lever 3 is located at the upward position as shown, the end member 4 is not pulled toward the seat 11, so that the quick-release device is at its release status. The protrusion of each stop member 2 does not protrude beyond the tube 1, and the users can easily tell which status the quick-release device "A" is set. The spring 5 is mounted to the axle 32 and biased between the seat 11 and the end member 4 so that the response of the movement of the axle 32 is quick.

Figure 6:
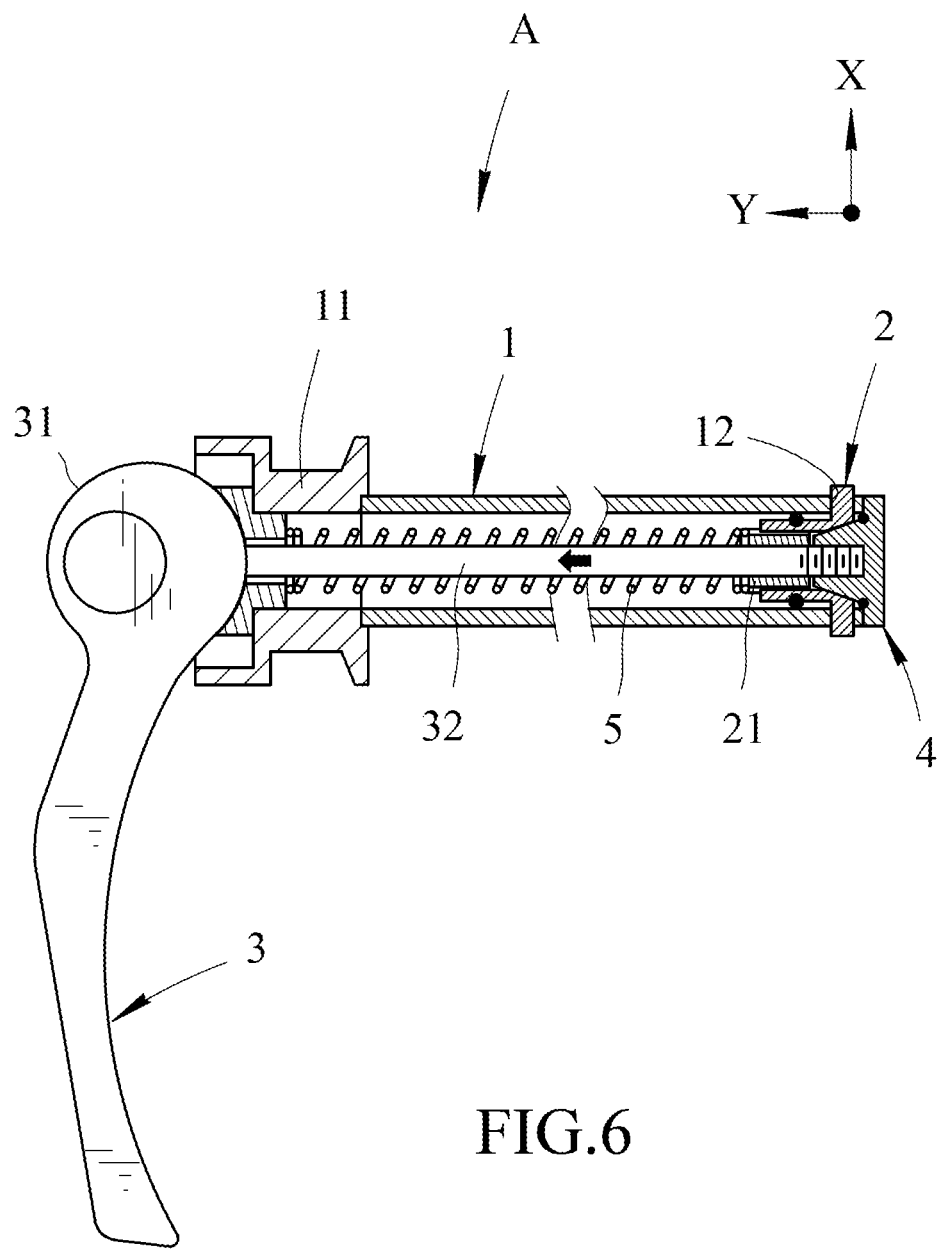
FIG. 6 is a cross sectional view to show that the quick-release device of the present invention is at the release status.

As shown in FIG. 6, when the lever 3 is located at the downward position as shown, the end member 4 is pulled toward the seat 11, so that the quick-release device is at its secured status. The end member 4 is moved toward the seat 11 by moving the tapered insertion portion thereof into the tube 1 along the Y-axis direction, and the inclined paths 41 push the stop members 2 to move in the X-axis direction, so that the protrusion of each stop member 2 does not protrude beyond the tube 1.

Figure 7:
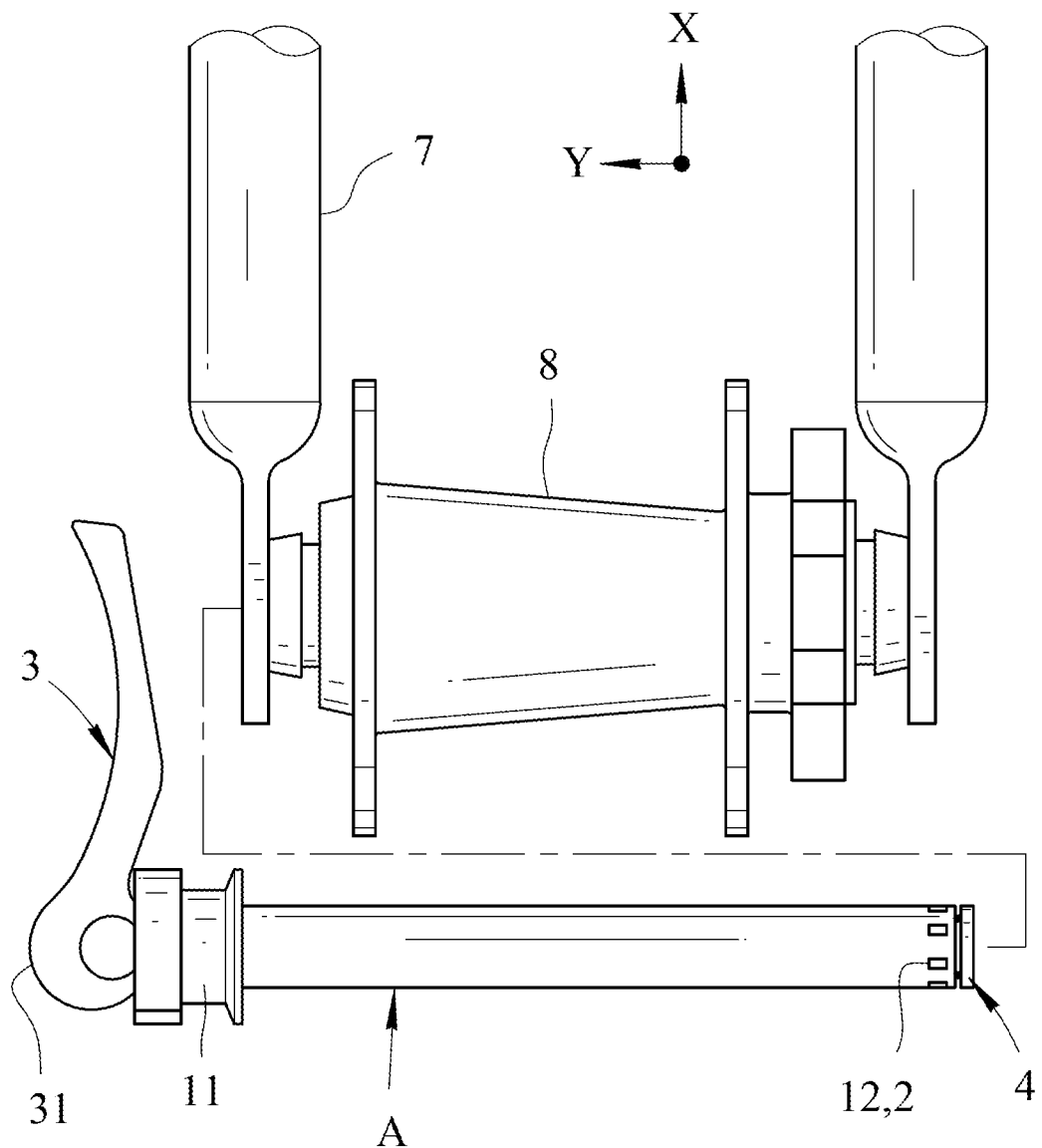
FIG. 7 shows that the quick-release device of the present invention is to be connected to the bicycle hub.
Figure 8:
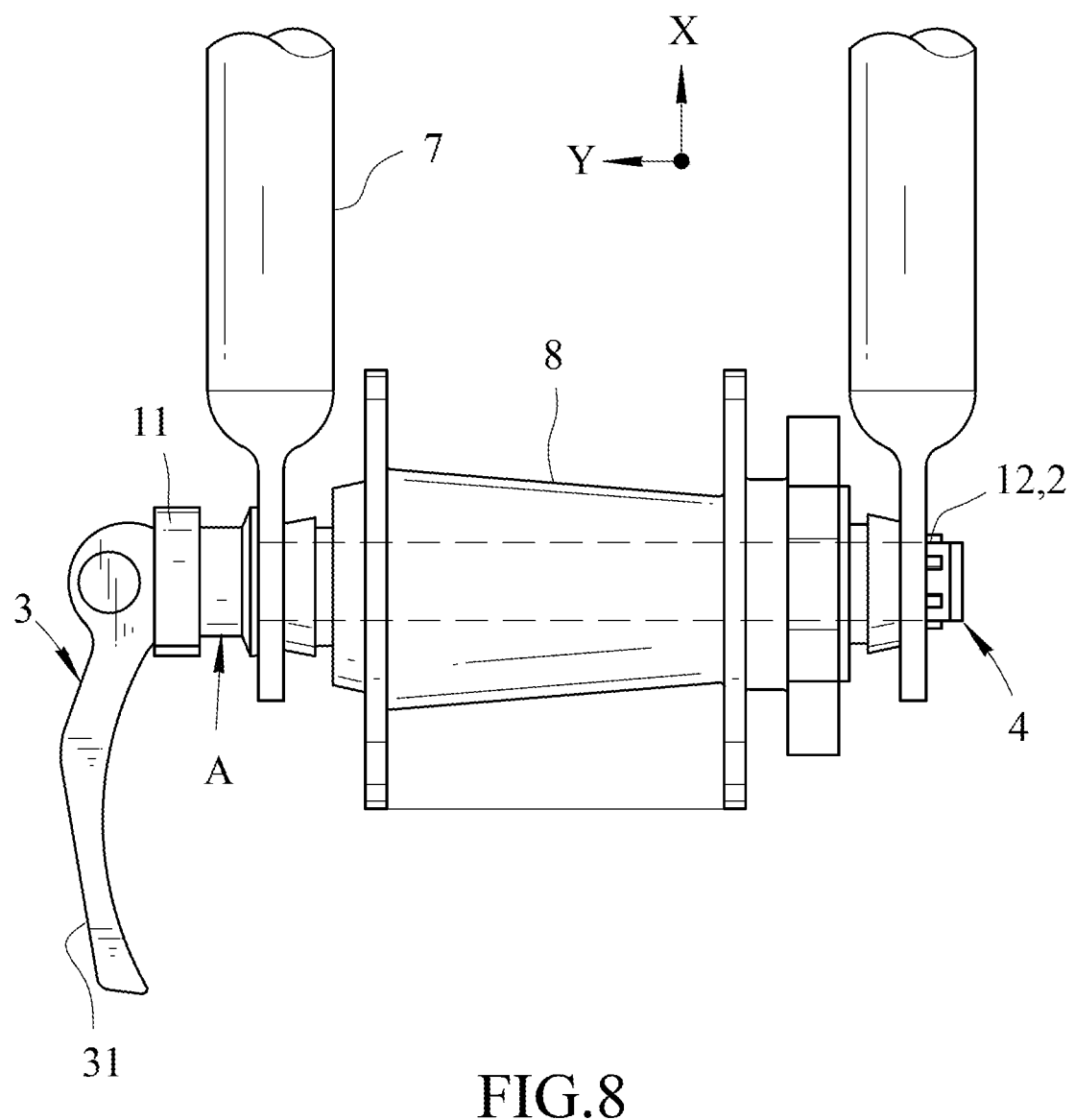
FIG. 8 shows that the quick-release device of the present invention is connected to the bicycle hub.

As shown in FIGS. 7 and 8, the quick-release device "A" can be easily connected to the hub 8 of the bicycle frame 7. The tube 1 extends through the hub 8, and the two legs of the front fork are engaged with the two ends of the tube 1.

Figure 9:
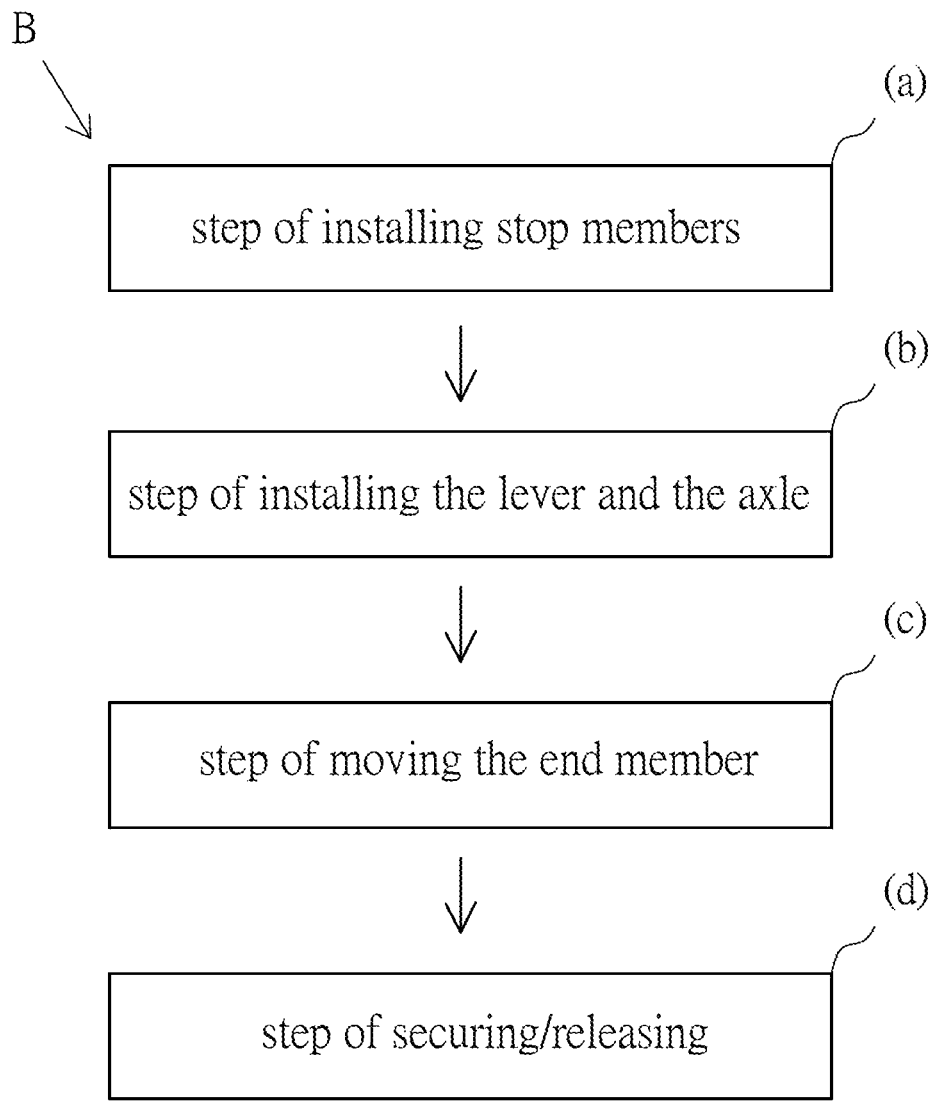
FIG. 9 shows the step for securing the quick-release device of the present invention.
Figure 10:
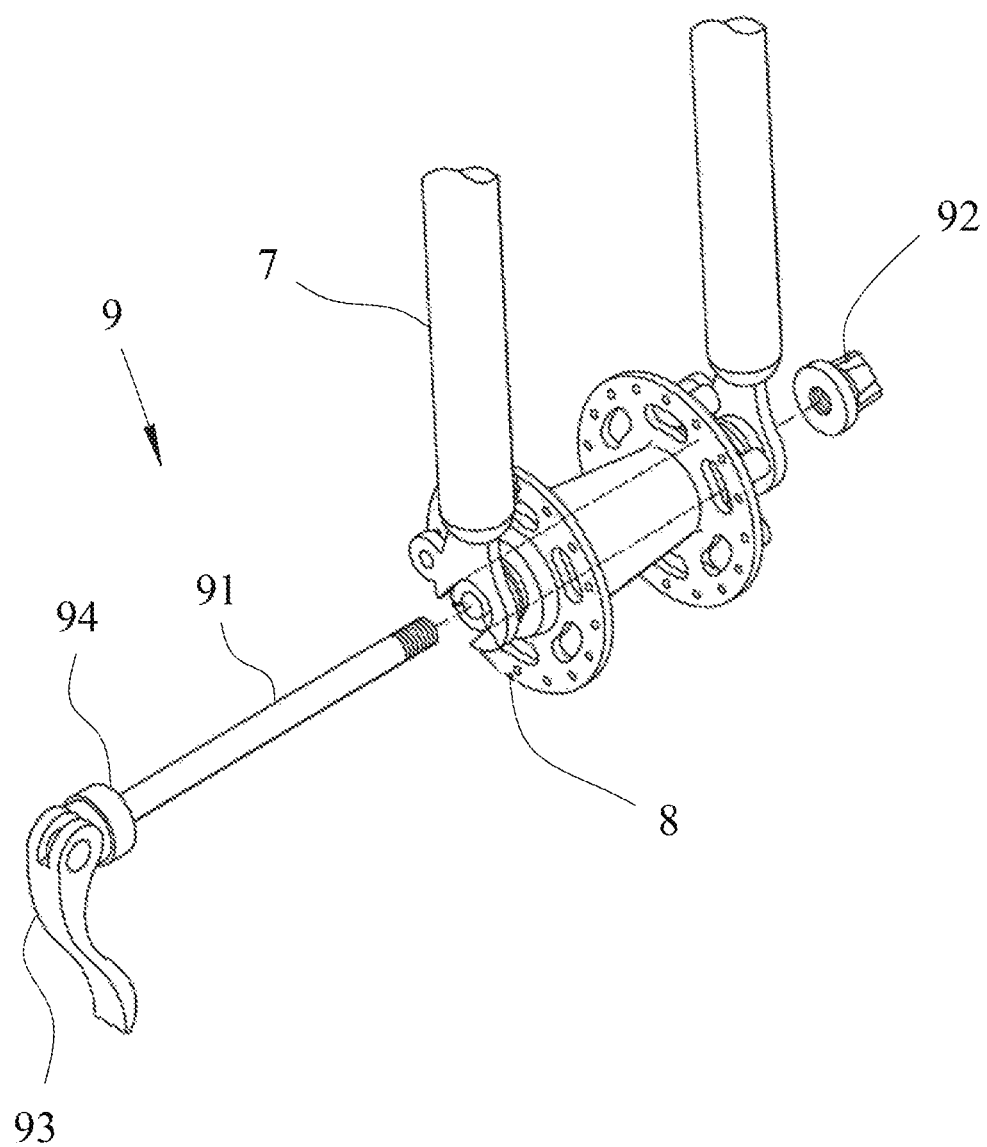
FIG. 10 shows the conventional quick-release device.

FIG. 9 shows the method "B" of securing/releasing the quick-release device "A", and the method "B" comprises the following steps:

A step (a) of installing stop members 2:

Installing multiple stop members 2 in the tube 1 and each of the stop members 2 has an inclined face 20 defined in the underside thereof. The stop members 20 movably in the X-axis direction to protrude through the holes 12 defined in the first end of the tube 1. A sleeve 21 is located in the tube 1 and the stop members 2 are located on the outside of the sleeve 21 and arranged in a loop arrangement.

A step (b) of installing the lever 3 and the axle 32:

The lever 3 has a cam portion 31 with which one end of the axle is pivotably connected. The axle 32 extends through the tube 1 and is pulled in the Y-axis direction by pivoting the lever 3.

A step (c) of moving the end member 4:

The end member 4 is movably inserted into the first end of the tube 1 and connected to the axle 32. The end member 4 is moved with the axle 32 to push the inclined faces 20 of the stop members 2 to move the stop members 20 in the X-axis direction, and A step (d) of securing/releasing:

The tube 1 includes a seat 11 connected to the second end thereof. The axle 32 is pulled by pivoting the lever 3 to move the end member 4 toward the seat 11. The stop members 2 partially protrude beyond the tube 1 to quickly secure or release the quick-release device "A".

While we have shown and described the embodiment in accordance with the present invention, it should be clear to those skilled in the art that further embodiments may be made without departing from the scope of the present invention.

What is claimed is:

1. A quick-release device comprising:

a tube having multiple holes defined through a wall in a first end thereof, a seat connected to a second end of the tube, a sleeve located in the first end of the tube;

multiple stop members located in the first end of the tube and movably engaged with the holes respectively, each stop member having an inclined face defined in an underside thereof;

a lever having a cam portion which is pivotably mounted to a first end of an axle, the axle extending through the tube, and an end member movably connected to the first end of the tube, a second end of the axle connected to the end member, when pivoting the lever, the end member is moved toward the seat or moved away from the seat.

2. The quick-release device as claimed in claim 1, wherein a spring is mounted to the axle and biased between the seat and the end member.

3. The quick-release device as claimed in claim 1, wherein the stop members each are an L-shaped member.

4. The quick-release device as claimed in claim 1, wherein the sleeve includes multiple grooves defined axially in an outside thereof, the stop members are located in the grooves respectively.

5. The quick-release device as claimed in claim 4, wherein a ring is resiliently mounted to the stop members to position the stop members in the grooves of the sleeve.

6. The quick-release device as claimed in claim 1, wherein the end member includes multiple inclined paths defined axially in an outside thereof, the stop members are moved along the inclined paths by the inclined faces, the stop members partially protrude through the holes when the lever is pivoted to set the quick-release device at a secured status.

\* \* \* \* \*